(12) United States Patent
Seol

(10) Patent No.: US 11,670,810 B2
(45) Date of Patent: Jun. 6, 2023

(54) BATTERY PACK

(71) Applicant: SAMSUNG SDI CO., LTD., Yongin-si (KR)

(72) Inventor: Jihwan Seol, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 75 days.

(21) Appl. No.: 16/911,537

(22) Filed: Jun. 25, 2020

(65) Prior Publication Data
US 2021/0028512 A1  Jan. 28, 2021

(30) Foreign Application Priority Data

Jul. 25, 2019 (KR) .................. 10-2019-0090485

(51) Int. Cl.
H01M 10/48 (2006.01)
H01M 10/42 (2006.01)
H01M 50/529 (2021.01)

(52) U.S. Cl.
CPC ....... H01M 10/482 (2013.01); H01M 10/425 (2013.01); H01M 50/529 (2021.01)

(58) Field of Classification Search
CPC combination set(s) only.
See application file for complete search history.

(56) References Cited

U.S. PATENT DOCUMENTS

| 5,248,927 | A  | * | 9/1993  | Takei ................. H01M 10/486 320/113 |
| 8,373,535 | B2 |   | 2/2013  | Lavenuta |
| 8,822,051 | B2 |   | 9/2014  | Yoo |
| 9,373,832 | B2 |   | 6/2016  | Park et al. |
| 9,444,086 | B2 |   | 9/2016  | Shimizu et al. |
| 9,466,863 | B2 |   | 10/2016 | Hong et al. |
| 9,515,356 | B2 |   | 12/2016 | Zeng et al. |
| 9,917,336 | B2 |   | 3/2018  | Nakano et al. |

(Continued)

FOREIGN PATENT DOCUMENTS

CN  1591964 A   3/2005
CN  101395781 A  3/2009

(Continued)

OTHER PUBLICATIONS

Chinese Office action and Search Report dated Jul. 29, 2022 for corresponding CN Patent Application No. 202010721832.8.

Primary Examiner — Amanda J Barrow
(74) Attorney, Agent, or Firm — Lee IP Law, P.C.

(57) ABSTRACT

A battery pack includes at least one battery cell having first and second end portions spaced apart from each other in a length direction of the at least one battery cell, and an outer peripheral surface between the first and second end portions, a circuit board connected to the at least one battery cell, the circuit board to monitor the at least one battery cell, and a sensor extending from the circuit board toward the at least one battery cell, the sensor contacting the outer peripheral surface of the at least one battery cell, and the sensor having a casing having a first surface that is concave toward the outer peripheral surface of the at least one battery cell, a thermistor chip inside the casing, a lead wire extending from the thermistor chip outside the casing, and a filler inside the casing.

19 Claims, 10 Drawing Sheets

(56) References Cited

U.S. PATENT DOCUMENTS

| | | | | |
|---|---|---|---|---|
| 2005/0046393 | A1* | 3/2005 | Nakasho | H02J 7/0045 320/150 |
| 2006/0028183 | A1 | 2/2006 | Izawa et al. | |
| 2007/0296541 | A1* | 12/2007 | Garcia | G01K 1/14 338/22 R |
| 2009/0041082 | A1* | 2/2009 | Paramasivam | G01R 31/374 374/208 |
| 2009/0155680 | A1 | 6/2009 | Maguire et al. | |
| 2012/0028083 | A1* | 2/2012 | Jung | H01M 10/486 429/7 |
| 2012/0121939 | A1* | 5/2012 | Yoo | H01M 10/425 429/7 |
| 2012/0169289 | A1* | 7/2012 | Kim | H01M 50/502 320/134 |
| 2012/0225334 | A1* | 9/2012 | Lee | H01M 10/425 429/62 |
| 2012/0251849 | A1 | 10/2012 | Park et al. | |
| 2012/0315507 | A1 | 12/2012 | Kim | |
| 2013/0043425 | A1* | 2/2013 | Yoshihara | C08K 3/28 252/76 |
| 2015/0118530 | A1 | 4/2015 | Lee | |
| 2017/0250395 | A1 | 8/2017 | Cheon et al. | |
| 2018/0259397 | A1* | 9/2018 | Saloio | G01K 7/00 |
| 2019/0219457 | A1* | 7/2019 | Kimbell | G01K 7/42 |

FOREIGN PATENT DOCUMENTS

| | | | | |
|---|---|---|---|---|
| CN | 102272976 | A | | 12/2011 |
| CN | 102468023 | A | | 5/2012 |
| CN | 202871923 | U | | 4/2013 |
| CN | 109029753 | A | | 12/2018 |
| JP | 2002-025633 | | * 1/2002 | ............ H01M 10/48 |
| JP | 2002-25633 | A | | 1/2002 |
| JP | 2002-199609 | A | | 7/2002 |
| JP | 2003-178732 | A | | 6/2003 |
| JP | 2005-080373 | A | | 3/2005 |
| JP | 2006-035942 | A | | 2/2006 |
| JP | 2011-103258 | A | | 5/2011 |
| JP | 2014-132585 | A | | 7/2014 |
| JP | 5593591 | B2 | | 8/2014 |
| JP | 2017-096687 | A | | 6/2017 |
| JP | 6227569 | B2 | | 10/2017 |
| JP | 2018-197723 | | * 12/2018 | ............... G01K 1/14 |
| JP | 2018-197723 | A | | 12/2018 |
| KR | 10-0854413 | B1 | | 8/2008 |
| KR | 10-2012-0053458 | A | | 5/2012 |
| KR | 10-2012-0059951 | | * 6/2012 | ............ H01M 50/50 |
| KR | 10-2012-0078373 | A | | 7/2012 |
| KR | 10-2015-0048501 | A | | 5/2015 |
| KR | 10-1537457 | B1 | | 7/2015 |
| KR | 10-1642341 | B1 | | 7/2016 |
| KR | 10-1836408 | B1 | | 3/2018 |
| KR | 10-2018-0088197 | A | | 8/2018 |
| WO | WO 2014/122905 | A1 | | 8/2014 |

* cited by examiner

BATTERY PACK

CROSS-REFERENCE TO RELATED APPLICATION

Korean Patent Application No. 10-2019-0090485, filed on Jul. 25, 2019, in the Korean Intellectual Property Office, and entitled: "Battery Pack," is incorporated by reference herein in its entirety.

BACKGROUND

1. Field

One or more embodiments relate to a battery pack.

2. Description of Related Art

In general, secondary batteries refer to batteries that can be repeatedly recharged unlike non-rechargeable primary batteries. Secondary batteries are used as energy sources of devices, e.g., mobile devices, electric vehicles, hybrid electric vehicles, electric bicycles, and uninterruptible power supplies. Single-cell secondary batteries or multi-cell secondary batteries (secondary battery packs) including a plurality of battery cells connected as one unit are used according to the types of external devices that use the secondary batteries.

Small mobile devices, e.g., cellular phones, may be operated for a predetermined time using single-cell secondary batteries. However, multi-cell secondary batteries (secondary battery packs) having high-output and high-capacity features may be required for devices having long operating times and requiring high power, e.g., electric vehicles or hybrid electric vehicles consuming large amounts of power. The output voltage or current of a battery pack may be increased by adjusting the number of batteries (battery cells) included in the battery pack.

SUMMARY

According to one or more embodiments, a battery pack may include at least one battery cell having first and second end portions spaced apart from each other in a length direction of the at least one battery cell, and an outer peripheral surface between the first and second end portions, a circuit board connected to the at least one battery cell, the circuit board to monitor the at least one battery cell, and a sensor extending from the circuit board toward the at least one battery cell, the sensor contacting the outer peripheral surface of the at least one battery cell, and the sensor having a casing having a first surface that is concave toward the outer peripheral surface of the at least one battery cell, a thermistor chip inside the casing, a lead wire extending from the thermistor chip outside the casing, and a filler inside the casing.

For example, the sensor may extend in an upright position with respect to the circuit board and along the length direction of the battery cell.

For example, the lead wire may extend outward from the casing through an open end portion of the casing and through a lead hole of the circuit board in an upright position.

For example, the battery pack may further include a pair of coupling protrusions protruding toward the circuit board from both sides of the open end portion of the casing, the pair of coupling protrusions extending through a pair of coupling holes formed in the circuit board.

For example, the casing may include a first surface including a concavely curved surface which matches a round shape of the outer peripheral surface of the battery cell, a second surface which is flat and is opposite the first surface, and lateral surfaces connecting the first and second surfaces to each other, the lateral surfaces including first lateral surfaces adjoining the first surface and second lateral surfaces adjoining the second surface.

For example, the first surface, the second surface, and the lateral surfaces may form a closed cross-section of the casing.

For example, the first surface may be widest from among the surfaces of the casing, and the second surface may be narrowest from among the surfaces of the casing.

For example, the first lateral surfaces may have slopes extending from the first surface toward boundaries between the first and second lateral surfaces, and the second lateral surfaces may have slopes approaching each other toward the second surface from the boundaries between the first and second lateral surfaces.

For example, the battery pack may further include a pressing member which presses the sensor against the outer peripheral surface of the battery cell.

For example, the pressing member may be in contact with a second surface of the sensor, the second surface being opposite a first surface of the sensor, the first surface being in contact with the battery cell.

For example, the battery cell may include a plurality of battery cells, and the battery pack may further include a cell holder providing assembly positions for the plurality of battery cells and structurally binding the plurality of battery cells together.

For example, the battery pack may further include a pressing member which presses the sensor unit against the outer peripheral surface of the battery cell, wherein the pressing member may include a fixed portion provided on an end thereof and fixed to the cell holder; and a pressing portion provided on another end thereof, the pressing portion extending from the fixed portion and contacting the sensor.

For example, the pressing member may extend obliquely toward the sensor from the fixed portion provided on the end and spaced apart from the sensor, may make tight contact with the sensor at the pressing portion provided on the other end, and may extend vertically together with the sensor in the length direction of the battery cell.

For example, the cell holder may be provided between the circuit board and the battery cell, and a sensor penetration hole through which the sensor extending between the circuit board and the battery cell penetrates the cell holder may be formed in the cell holder.

For example, the casing and the filler may include different resin materials.

For example, the casing may include a thermoplastic resin, and the filler may include a thermosetting resin.

For example, the sensor may further include a tab member electrically connected to an end portion among the first and second end portions of the battery cell.

For example, the tab member may extend across the outer peripheral surface of the battery cell to penetrate the casing, and may electrically connect the end portion of the battery cell to the circuit board.

For example, the tab member may extend outward from the casing in parallel with the lead wire through an open end portion of the casing and may be connected to the circuit board, and the tab member may extend to the end portion of the battery cell through a bottom portion of the casing, the bottom portion being opposite the open end portion of the casing.

For example, the filler may be provided for electrical insulation between the tab member and the lead wire.

BRIEF DESCRIPTION OF THE DRAWINGS

Features will become apparent to those of skill in the art by describing in detail exemplary embodiments with reference to the attached drawings, in which.

DETAILED DESCRIPTION

Figure 1:
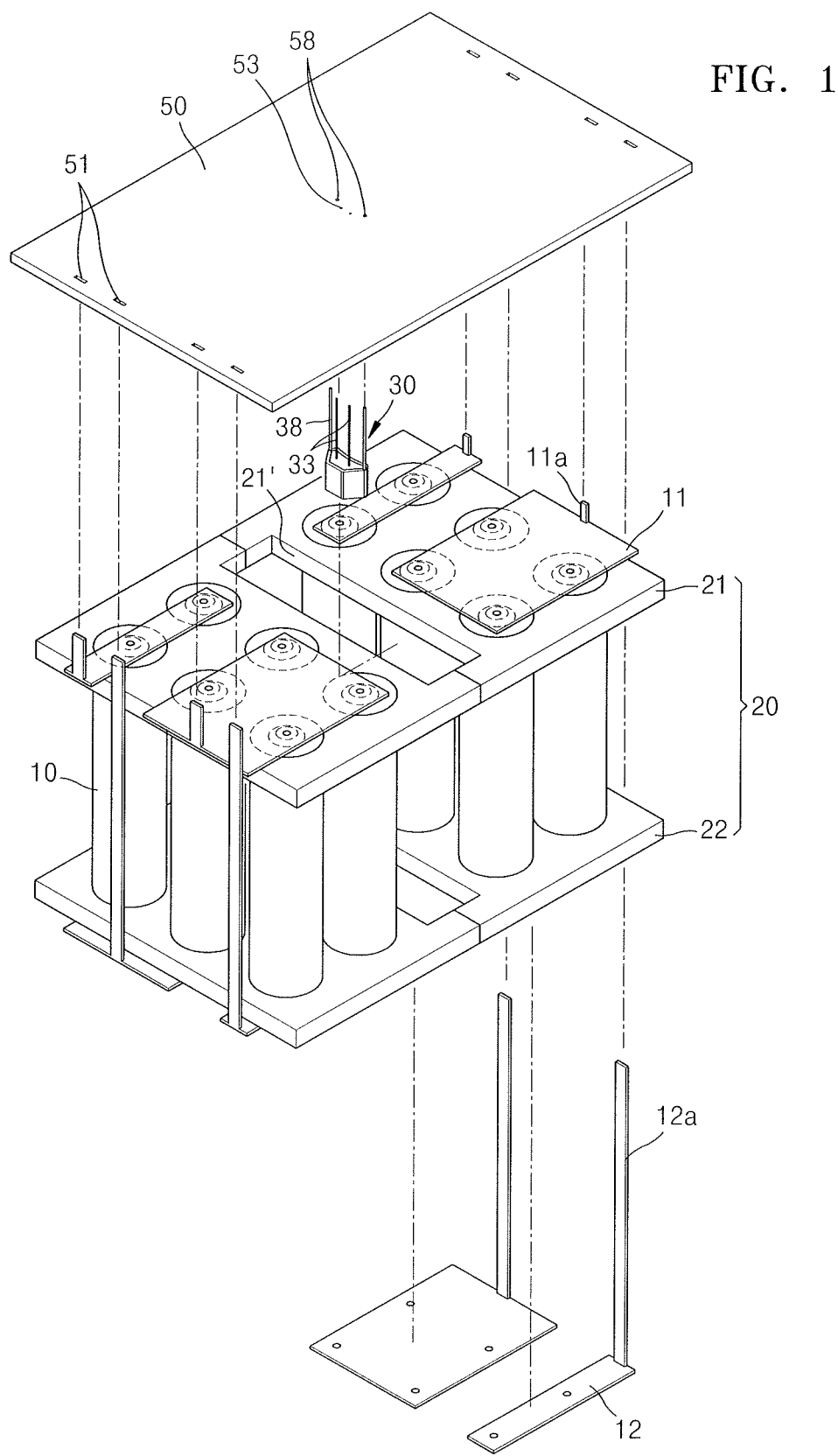
FIGS. 1 and 2 are exploded perspective views of a battery pack according to embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Battery packs will now be described according to embodiments with reference to the accompanying drawings.

Figure 2:
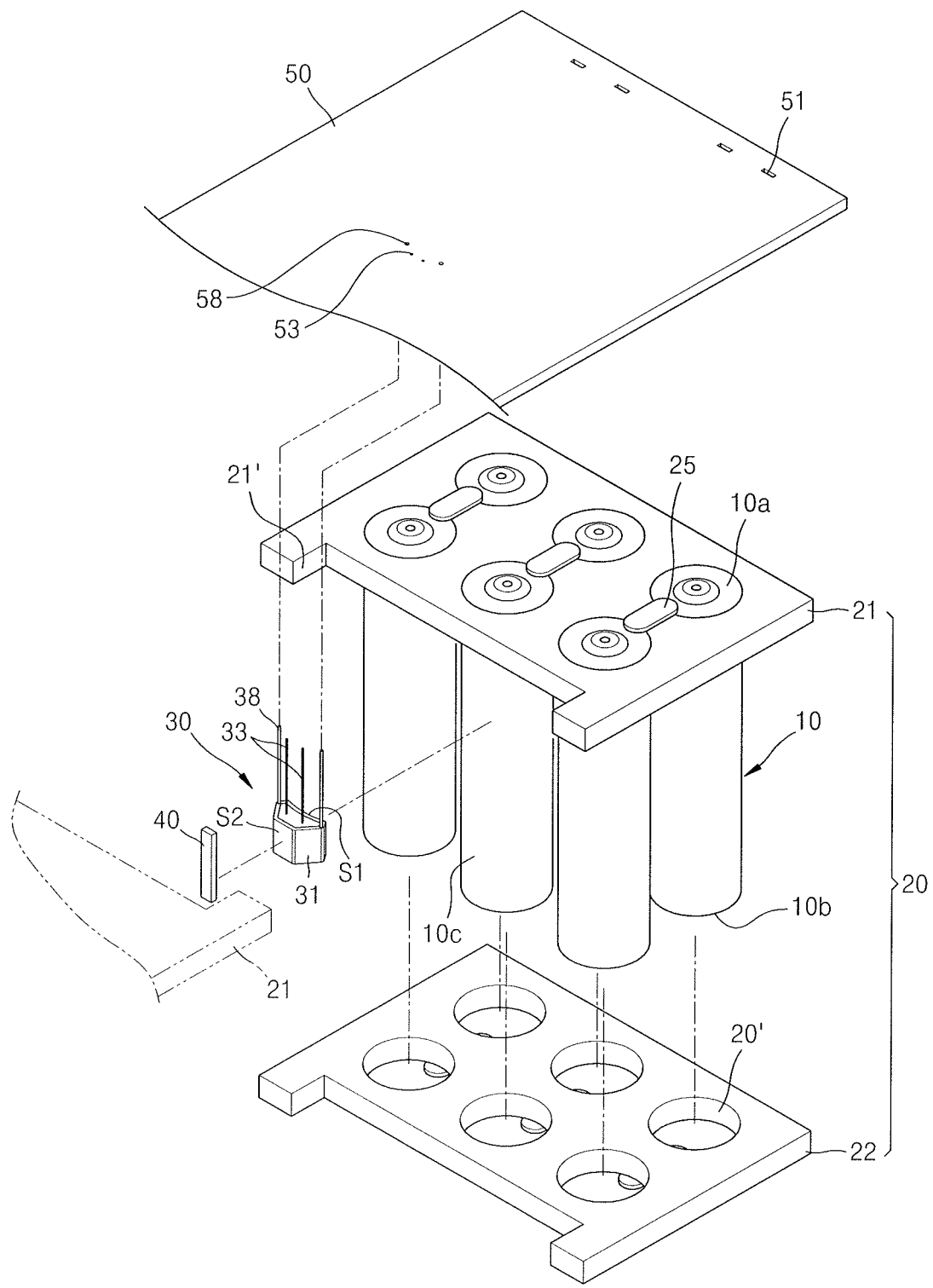
Figure 3:
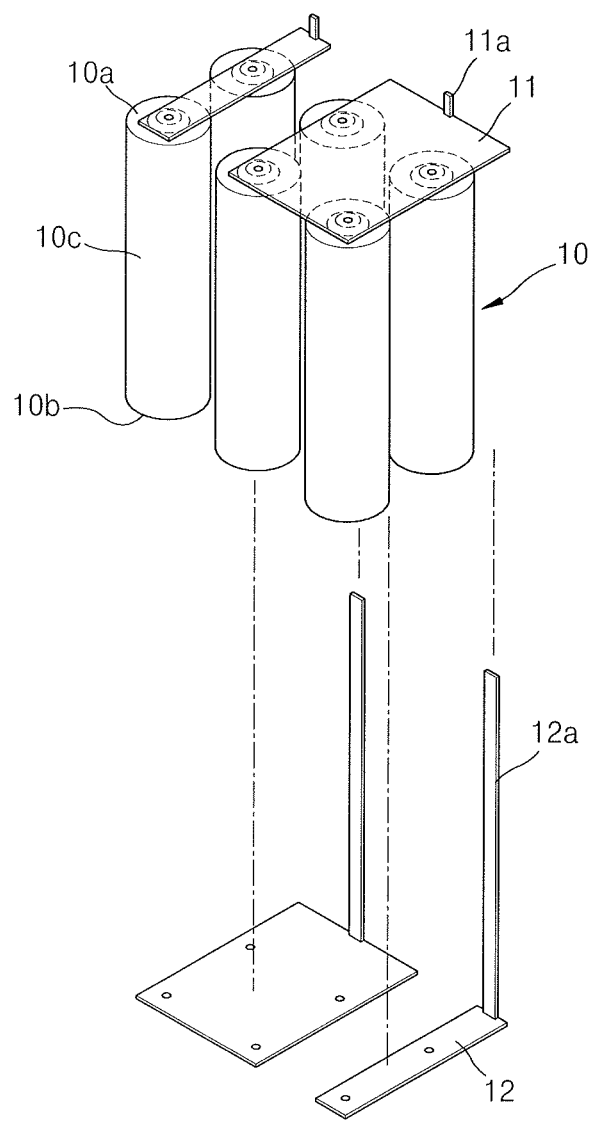
FIG. 3 is an exploded perspective view of an electrical connection between battery cells in FIG. 1.

FIGS. 1 and 2 are exploded perspective views illustrating a battery pack according to embodiments. FIG. 3 is a view of an electrical connection between battery cells 10 in FIG. 1.

Referring to FIGS. 1 and 2, the battery pack may include a plurality of battery cells 10, a cell holder 20 into which the battery cells 10 are fitted, and a circuit board 50 arranged on the cell holder 20. For ease of illustration, the battery cells 10 and the electrical connection between the battery cells 10 will be first described with reference to FIG. 3 according to an embodiment, and then the overall structure of the battery pack will be described with reference to FIGS. 1 and 2.

Referring to FIG. 3, each of the battery cells 10 may include a first end portion 10a, a second end portion 10b, and an outer peripheral surface 10c connecting the first and second end portions 10a and 10b to each other. In an embodiment, terminals having different polarities may be formed on the first and second end portions 10a and 10b of the battery cells 10, and the battery cells 10 may be electrically connected in series, parallel, or series-parallel to each other through first and second tab plates 11 and 12 connected to the first and second end portions 10a and 10b of the battery cells 10. In the present disclosure, the first and second end portions 10a and 10b of the battery cells 10 refer to end portions arranged at relatively upper positions and end portions arranged at relatively lower positions in the length direction of the battery cells 10 according to spatial arrangement. Thus, the first end portions 10a of the battery cells 10 may have the same polarity or different polarities, and similarly, the second end portions 10b of the battery cells 10 may have the same polarity or different polarities. For example, when some of the battery cells 10 are arranged upside down to vertically reverse some of the battery cells 10, the first end portions 10a of the battery cells 10 may have different polarities, and the second end portions 10b of the battery cells 10 may have different polarities.

In an embodiment, the battery cells 10 may be provided as, e.g., cylindrical battery cells 10. In this case, the first and second end portions 10a and 10b may have a circular shape with a predetermined radius, and the outer peripheral surfaces 10c connecting the first and second end portions 10a and 10b to each other may have a round, e.g., cylindrical, shape. Throughout the present specification, an upward/downward direction or a vertical direction may refer to a longitudinal direction of the battery cells 10, i.e., a direction along the extension direction of the outer peripheral surfaces 10c, which connect the first and second end portions 10a and 10b of each of the battery cells 10 to each other.

The first and second end portions 10a and 10b of the battery cells 10 may be electrically connected to each other through the first and second tab plates 11 and 12, respectively. As described later, the first and second tab plates 11 and 12 may be respectively arranged on first and second cell holders 21 and 22 (refer to FIG. 1), and the first and second tab plates 11 and 12 may be electrically connected to the circuit board 50 through first and second tabs 11a and 12a extending from the first and second tab plates 11 and 12 to the circuit board 50. A structure for connecting the first and second tab plates 11 and 12 to the circuit board 50 will be described in more detail below.

Referring to FIGS. 1 and 2, the cell holder 20 may include first and second cell holders 21 and 22 spaced apart from each other along the vertical direction. The first and second cell holders 21 and 22 may be coupled to each other to face each other with the battery cells 10 being arranged therebetween. Accommodation portions 20' configured to surround, e.g., each of, the first and second end portions 10a and 10b may be formed in, e.g., each of, the first and second cell holders 21 and 22 (FIG. 2). As the battery cells 10 are coupled to the first and second cell holders 21 and 22 by inserting the first and second end portions 10a and 10b of the battery cells 10 into respective ones of the accommodation portions 20', the positions of the battery cells 10 may be fixed. That is, the cell holder 20 may structurally bind the battery cells 10 together while providing assembly positions for the battery cells 10, and as the battery cells 10 are coupled to the cell holder 20, the battery cells 10 may be modularized as the battery pack.

The accommodation portions 20' may be formed in a shape corresponding to that of the first and second end portions 10a and 10b, e.g., in a circular shape to surround the circular shapes of the first and second end portions 10a and 10b of the battery cells 10. At least portions of the first and second end portions 10a and 10b surrounded by the accommodation portions 20' may be exposed to the outside of the cell holder 20, e.g., the first end portions 10a may be exposed through an opening in the first cell holder 21 (FIG. 2). The first and second end portions 10a and 10b of the battery cells 10 exposed to the outside of the cell holder 20 may be electrically connected to the first and second tab plates 11 and 12 (FIG. 1). In an embodiment, the first and second end portions 10a and 10b of the battery cells 10 may be exposed to the outside of the cell holder 20 through openings of the accommodation portions 20', and stoppers 25 (refer to FIG. 2) formed near the openings of the accommodation portions 20' may fix the battery cells 10 within the openings of the accommodation portions 20' to prevent movement of the battery cells 10 outside the cell holder 20.

The first and second cell holders 21 and 22 or the accommodation portions 20' of the first and second cell holders 21 and 22 may have a predetermined thickness in the length, e.g., longitudinal, direction of the battery cells 10 to surround the first and second end portions 10a and 10b of the battery cells 10. For example, the accommodation portions 20' may have a predetermined thickness, e.g., along the vertical direction, to expose at least portions of the outer peripheral surfaces 10c of the battery cells 10 in the length direction of the battery cells 10, e.g., a thickness of the accommodation portions 20' in the second cell holder 22 along the vertical direction may equal that of the second cell holder 22 (FIG. 2). For example, referring to FIG. 2, the accommodation portions 20' of the second cell holder 22 may cover only a portion of a bottom of each of the battery cells 10, e.g., only a portion of a bottom of the outer peripheral surface 10c of each of the battery cells 10, so a majority of the outer peripheral surface 10c of each of the battery cells 10 may be exposed between the first and second cell holders 21 and 22.

A sensor unit 30, i.e., a sensor, may be provided in contact with the exposed outer peripheral surface 10c of a battery cell 10 to detect temperature information from the battery cell 10. For example, referring to FIGS. 1-2, the sensor unit 30 may be inserted to be in contact with the exposed outer peripheral surface 10c of one of the battery cells 10, e.g., between two groups of battery cells 10.

For example, the first and second cell holders 21 and 22 or the accommodation portions 20' of the first and second cell holders 21 and 22 may have a predetermined thickness in the length direction of the battery cells 10, e.g., in the vertical direction, so the thickness of the first and second cell holders 21 and 22 or the accommodation portions 20' of the first and second cell holders 21 and 22 may be limited in a center region in the length direction of the battery cells 10 to exclude the accommodation portions 20' from the center region. For example, referring to FIG. 2, the first and second cell holders 21 and 22 or the accommodation portions 20' may be excluded from the center regions of the battery cells 10 to sufficiently expose the center regions of the battery cells 10 to accommodate contact with the sensor unit 30.

In this case, the sensor unit 30 may be in contact with the outer peripheral surface 10c of the battery cell 10 which is exposed between the accommodation portions 20' of the first and second cell holders 21 and 22. The sensor unit 30 may be in contact with the outer peripheral surface 10c of the battery cell 10 and may output information about the temperature of the battery cell 10. The sensor unit 30 will be described in more detail below with reference to FIGS. 4-6.

The first and second tab plates 11 and 12 for electrically connecting the battery cells 10 to each other, and the circuit board 50 electrically connected to the first and second tab plates 11 and 12 may be arranged on the cell holder 20. That is, the first and second tab plates 11 and 12 for electrically connecting the first and second end portions 10a and 10b of the battery cells 10 to each other may be respectively arranged on the first and second cell holders 21 and 22, and the circuit board 50 may be arranged on one of the first and second cell holders 21 and 22, e.g., on the first cell holder 21.

The circuit board 50 may obtain information about the voltage and temperature of the battery cells 10 to monitor the state of the battery cells 10. Based on the obtained information about the voltage and temperature of the battery cells 10, the circuit board 50 may control the charge and discharge operations of the battery cells 10 or may handle another circuit to control the charge and discharge operations of the battery cells 10.

The circuit board 50 may be electrically connected to the first and second tab plates 11 and 12 through the first and second tabs 11a and 12a, and may obtain information about the voltage of the battery cells 10 which are connected to the first and second tab plates 11 and 12. The first and second tabs 11a and 12a may respectively extend from the first and second tab plates 11 and 12 and may be connected to the circuit board 50, and may transmit information about the voltage of the battery cells 10 connected to the first and second tab plates 11 and 12 to the circuit board 50. For example, the circuit board 50 may be arranged on the cell holder 20, e.g., selectively on the first cell holder 21 of the first and second cell holders 21 and 22, and thus, may be closer to the first tab plates 11 than to the second tab plates 12. Therefore, in this case, the lengths of the first tabs 11a between the first tab plates 11 and the circuit board 50 may be relatively short, and the lengths of the second tabs 12a between the second tab plates 12 and the circuit board 50 may be relatively long, e.g., lengths of the second tabs 12a along the vertical direction may be longer than lengths of the first tabs 11a along the vertical direction. For example, the second tabs 12a may extend along an outer surface of the cell holder 20, i.e., along outer surfaces of the first and second cell holders 21 and 22, and may then be connected to the circuit board 50. Since the cell holder 20 is arranged between the second tabs 12a and the outer peripheral surfaces 10c of the battery cells 10, electrical interference or a short circuit may be prevented between the second tabs 12a and the battery cells 10.

The first and second tabs 11a and 12a may be fitted into tab holes 51 of the circuit board 50, and thus the first and second tabs 11a and 12a may be electrically connected to the circuit board 50 at the same time by inserting all the first and second tabs 11a and 12a into the tab holes 51 of the circuit board 50 when mounting the circuit board 50 on the cell holder 20. For example, the first and second tabs 11a and 12a may be coupled to the tab holes 51 of the circuit board 50 by soldering.

The circuit board 50 may obtain temperature information from the battery cells 10 through the sensor unit 30. The sensor unit 30 may be in tight contact with the outer peripheral surface 10c of a battery cell 10 and may output an electrical signal containing information about the temperature of the battery cell 10 to the circuit board 50.

For example, referring to FIG. 2, the sensor unit 30 may have first and second surfaces S1 and S2 opposite each other, with the first surface S1 facing and tightly contacting the battery cell 10. A pressing member 40 may extend from the cell holder 20, and may be brought into contact with the second surface S2 of the sensor unit 30. Therefore, the sensor unit 30 may be pressed against the battery cell 10 by the pressing member 40.

Figure 4:
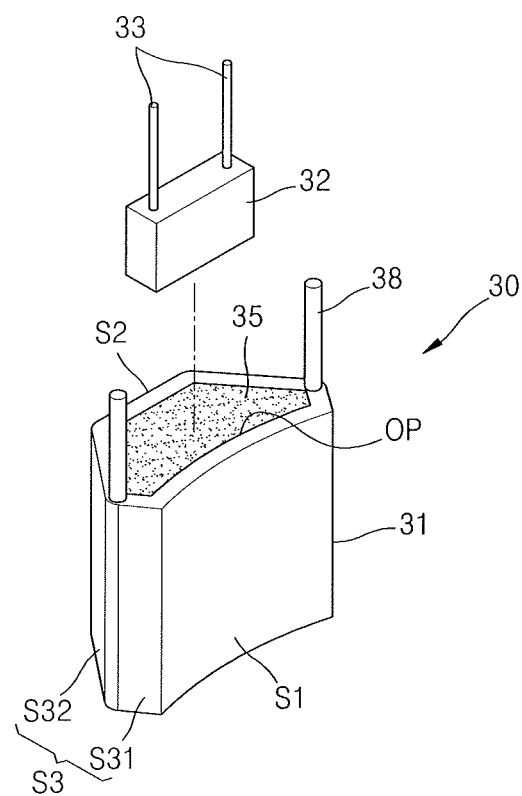
FIG. 4 is an exploded perspective view of a sensor unit according to embodiments.
Figure 5:
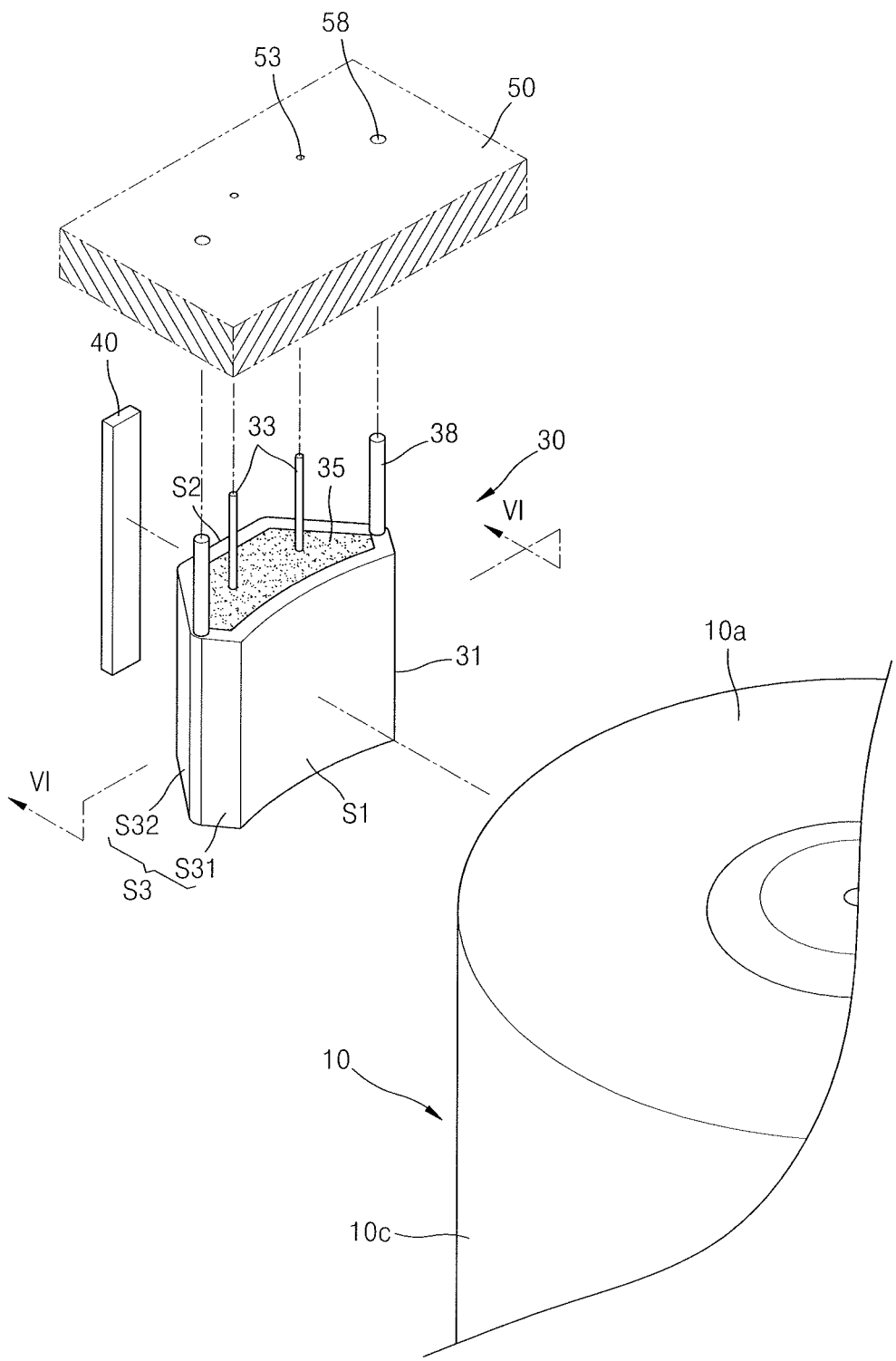
FIG. 5 is a perspective view of a mounted state of the sensor unit in FIG. 4.
Figure 6:
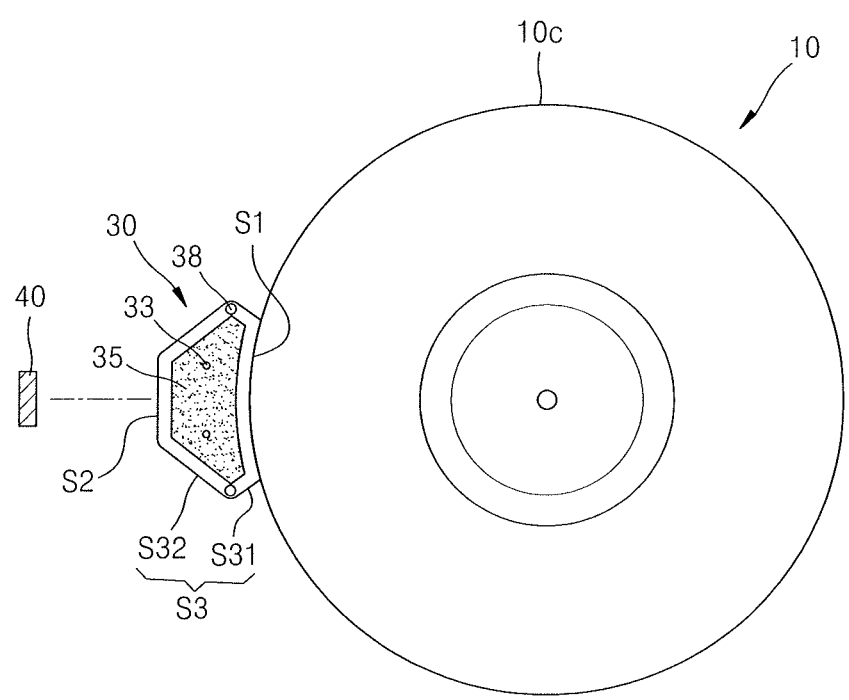
FIG. 6 is a cross-sectional view along line VI-VI of FIG. 5.

FIGS. 4 to 6 are view illustrating the sensor unit 30 according to embodiments, FIG. 4 is an exploded perspective view illustrating the sensor unit 30, FIG. 5 is a perspective view illustrating a mounted state of the sensor unit 30, and FIG. 6 is a cross-sectional view (from a top view) along line VI-VI of FIG. 5.

Referring to FIG. 4, the sensor unit 30 may include a casing 31, a thermistor chip 32 accommodated in the casing 31, a pair of lead wires 33 extending from the thermistor chip 32 to the outside of the casing 31, and a filler 35 filled in the casing 31.

The casing 31 may be formed in a hollow tube shape to accommodate the thermistor chip 32 and the pair of lead wires 33 connected to the thermistor chip 32. For example, the casing 31 may include an open end portion OP which is open to the outside, and the thermistor chip 32, to which the pair of lead wires 33 are connected, may be accommodated in the casing 31 through the open end portion OP. In this case, as the filler 35 is filled in the casing 31 through the open end portion OP of the casing 31, the position of the thermistor chip 32 may be fixed, and heat may smoothly flow from the casing 31 to the thermistor chip 32, such that the thermistor chip 32 accommodated in the casing 31 may sensitively detect the temperature of the battery cell 10 through the filler 35. All other ends of the casing 31 except for the open end portion OP may be sealed to prevent leakage of the filler 35 when the filler 35 is filled in the casing 31 in a liquid or gel state.

The filler 35 may include a thermosetting resin, e.g., an epoxy resin, by considering thermal conductivity, such that the filler 35 may be cured after being filled in the casing 31 in a liquid or gel state having fluidity. The filler 35 may include a material having high thermal conductivity such that heat may smoothly flow to the thermistor chip 32 from the casing 31 making direct contact with the battery cell 10.

In an embodiment, the thermistor chip 32 may include a variable resistor, i.e., a resistor in which the resistance varies with temperature, and the variable resistor may be connected between the pair of lead wires 33, such that temperature variations may be detected by measuring the voltage difference across the pair of lead wires 33. The thermistor chip 32 and the pair of lead wires 33 may be electrically connected to each other, and after the thermistor chip 32 with the pair of lead wires 33 are accommodated in the casing 31 through the open end portion OP, the filler 35 may be filled in the casing 31 to fix the thermistor chip 32 with the pair of lead wires 33 to the inside of the casing 31.

Referring to FIG. 6, the casing 31 may include the first surface S1 which faces the outer peripheral surface 10c of the battery cell 10, the second surface S2 which is opposite the first surface S1, and lateral surfaces S3 connecting the first and second surfaces S1 and S2 to each other. As illustrated in FIG. 6, the first surface S1 of the easing 31 directly contacts the outer peripheral surface the of the at least one battery cell 10. For example, the first and second surfaces S1 and S2 and the lateral surfaces S3 of the casing 31 may form a closed cross-section of the casing 31, e.g., in the top view of FIG. 6. In addition, since the casing 31 forms the outer shape of the sensor unit 30, the first and second surfaces S1 and S2 and the lateral surfaces S3 of the casing 31 may correspond to the first and second surfaces S1 and S2 and lateral surfaces S3 of the sensor unit 30.

The first surface S1 of the casing 31 may include a concavely curved surface facing the outer peripheral surface 10c of the rounded battery cell 10, e.g., the first surface S1 may be conformal on (or complementary with respect to) the outer peripheral surface 10c. For example, if the battery cell 10 is a cylindrical battery cell 10, the first surface S1 of the casing 31 may include a concavely curved surface having a predetermined radius of curvature that matches the outer peripheral surface 10c of the battery cell 10 and may form a circular arc surrounding, e.g., tracing the surface of, the battery cell 10.

Since the first surface S1 of the casing 31 is formed as a concavely curved surface corresponding to the outer peripheral surface 10c of the battery cell 10 for tight contact with the outer peripheral surface 10c of the battery cell 10, while surrounding, the outer peripheral surface 10c of the battery cell 10, the casing 31 may not be separated from the battery cell 10. In other words, a gap may not be formed between the casing 31 and the battery cell 10, thereby reducing thermal resistance between the casing 31 and the battery cell 10. Since the first surface S1 of the easing 31 is in tight contact with the battery cell 10 without any gap therebetween, the temperature of the battery cell 10 may be sensitively, e.g., accurately, measured to detect, e.g., without failure, abnormal heating of the battery cell 10 and immediately take protective measures, e.g., stopping charge and discharge operations. In an embodiment, the first surface S1 of the casing 31 may be widest from among the surfaces of the casing 31, e.g., as measured along the outer peripheral surface 10c of the battery cell 10, to guarantee a sufficient contact area with the battery cell 10. As illustrated in FIG. 6, the first surface S1 of the easing 31 has a largest width among widths of other surfaces of the casing 31, as viewed in a top view, with the width of the first surface S1 being measured along a curvature of the first surface S1, e.g., between opposite ends of the first surface S1 that are located at different points along a circumference of the outer peripheral surface 10c of the battery cell 10. For example, the first surface S1 of the casing 31 may be wider than each of the second surface S2 and the lateral surfaces S3, e.g., a total surface area of the first surface S1 mays be larger than each of a total surface areas of the second surface S2 and the lateral surfaces S3.

The second surface S2, which is opposite the first surface S1 including a concavely curved surface, may include a flat surface. The pressing member 40 may be brought into contact with the second surface S2 to press the sensor unit 30 against the outer peripheral surface 10c of the battery cell 10, so the flat surface of the second surface S2 may maintain a stable surface contact with the pressing member 40.

In an embodiment, the second surface S2 of the casing 31 may be narrowest, e.g., smallest, from among the surfaces of the casing 31. For example, the second surface S2 of the casing 31 may be narrower than the first surface S1 which is opposite the second surface S2 and may also be narrower than the lateral surfaces S3 which connect the first surface S1 and the second surface S2 to each other. Since the casing 31 forming the outer shape of the sensor unit 30 may physically interfere with surrounding components, the narrow, e.g., small, size of the second surface S2 minimizes such interference. For example, the sensor unit 30 may be placed between densely arranged battery cells 10, and thus the second surface S2 of the casing 31 (which is most distant from the battery cell 10 to be monitored and may thus interfere with surrounding battery cells 10) may be formed to have the narrowest area from among the surfaces of the casing 31. The second surface S2 of the casing 31 may be formed to be as narrow as possible as long as sufficient area is provided to apply pressure thereto by the pressing member 40.

Each lateral surface S3 between the first surface S1 and the second surface S2 may include a first lateral surface S31 adjoining the first surface S1, and a second lateral surface S32 adjoining the second surface S2. The lateral surfaces S3 may be connected between the first surface S1 (which is the widest surface) and the second surface S2 (which is the narrowest surface). As illustrated in FIG. 4, the second surface S2 is narrowest (i.e., has a smallest width) among the first surface S1 and the lateral surface S3, as described above, with the length of the lateral surface 53 being a combined length of the first lateral surface S31 and the second lateral surface S32. For example, the first lateral surfaces S31 may include slanted surfaces having slopes extending from the first surface S1 toward the boundaries between the first and second lateral surfaces S31 and S32, each first lateral surface S31 may extend from an end of the first surface S1 at an obtuse angle with respect to the first surface S1. Thus, the first lateral surfaces S31 may stably support the first surface S1 While extending wide from the first surface S1. For example, the second lateral surfaces S32 may include slanted surfaces having slopes approaching each other toward the second surface S2 from the boundaries between the first and second lateral surfaces S31 and S32, e.g., each second lateral surface S32 may extend from an end of a respective first lateral surface S31 toward the second surface S2 to define an obtuse angle with respect to the second surface S1 Thus, the second lateral surfaces S2 may not interfere e contact, with surrounding battery cells 10 because the second lateral surfaces S32 approach each other in a direction toward second surface S2. For example, the first lateral surfaces S31 and the second lateral surfaces S32 may have opposite slopes that reverse at the boundaries between the first lateral surfaces S31 and the second lateral surfaces S32, thereby forming a rhombus shape. In an embodiment, the second lateral surfaces S32 may be formed to be wider than the first lateral surfaces S31 to prevent or minimize interference, e.g., contact, with surrounding battery cells 10.

The casing 31 may include a flexible material having elasticity or flexibility for tight contact with the outer peripheral surface 10c of the battery cell 10. For example, the casing 31 may include a thermoplastic resin. For example, the casing 31 may be brought into contact with the outer peripheral surface 10c of the battery cell 10 by pressure, while the casing 31 is flexibly deformed to surround and contact the outer peripheral surface 10c of the battery cell 10.

Referring to FIG. 5, a pair of coupling protrusions 38 protruding toward the circuit board 50 may be formed on the casing 31. The pair of coupling protrusions 38 may be fitted into a pair of coupling holes 58 formed in the circuit board 50, such that the sensor unit 30 including the casing 31 may be fixed. The pair of coupling protrusions 38 may be formed on the open end portion OP of the casing 31 and may protrude from the open end portion OP toward the circuit board 50. For example, the pair of coupling protrusions 38 may be formed on both lateral ends of the open end portion OP, and the pair of lead wires 33 may extend outward between the pair of coupling protrusions 38. As the coupling protrusions 38 of the sensor unit 30 are fitted into the coupling holes 58 of the circuit board 50, the sensor unit 30 may be coupled to the circuit board 50 in an upright position with respect to the circuit board 50, e.g., the sensor unit 30 may be perpendicular to a surface of the circuit board 50 facing the sensor unit 30.

The sensor unit 30 may be coupled to the circuit board 50 in an upright position with respect to the circuit board 50 while extending in the length direction of the battery cell 10, e.g., the sensor unit 30 and the coupling protrusions 38 may extend along the vertical direction that is perpendicular to a major surface of the circuit board 50. Here, the expression "the sensor unit 30 is coupled to the circuit board 50 in an upright position with respect to the circuit board 50" may mean that the sensor unit 30 is in contact with the outer peripheral surface 10c of the battery cell 10 while extending in the length direction of the battery cell 10 in an upright or substantially upright position on the circuit board 50. Here, the extension direction of the sensor unit 30 may refer to the extension direction of the pair of lead wires 33, and the pair of lead wires 33 may extend in an upright or substantially upright position from the circuit board 50.

The pair of lead wires 33 may be conductively coupled to the circuit board 50 as being respectively fitted into lead holes 53 of the circuit board 50 in an upright position, and the sensor unit 30 may be coupled to the circuit board 50 as the pair of lead wires 33 are coupled to the circuit board 50. That is, in an embodiment, the positions of the sensor unit 30 and the circuit board 50 may be fixed twice through the insertion of the coupling protrusions 38 of the sensor unit 30 into the coupling holes 58 of the circuit board 50 and the conductive coupling of the pair of lead wires 33 of the sensor unit 30 to the lead holes 53 of the circuit board 50. For example, in a state in which the sensor unit 30 is primarily stably fixed by inserting the coupling protrusions 38 of the sensor unit 30 into the coupling holes 58 of the circuit board 50, the pair of lead wires 33 of the sensor unit 30 may be secondly conductively coupled to the lead holes 53 of the circuit board 50. The conductive coupling between the pair of lead wires 33 and the circuit board 50 may be achieved by soldering, e.g., surface mount technology (SMT) reflow soldering. In an embodiment, the pair of lead wires 33 may include rigid metal rods or thin metal plates, and after the pair of lead wires 33 are fitted into the lead holes 53 of the circuit board 50, the pair of lead wires 33 may be coupled to the circuit board 50 by reflow soldering. In another embodiment, the pair of lead wires 33 may include flexible metal wires such that the pair of lead wires 33 may be soldered to conductive pads of the circuit board 50.

Figure 7:
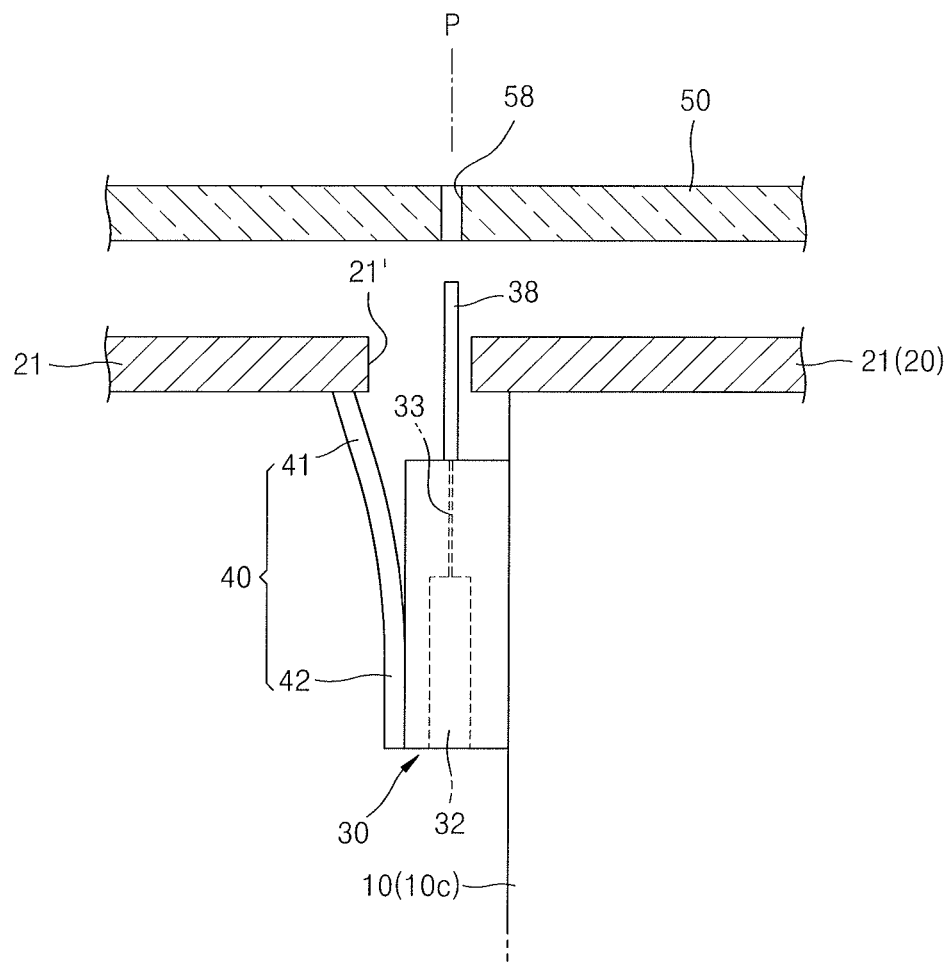
FIG. 7 is a cross-sectional view of a pressing member in a battery pack according to embodiments.

The sensor unit 30 may be in contact with the outer peripheral surface 10c of the battery cell 10 while extending from the circuit board 50 in an upright or substantially upright position. For example, a coupling position P of the sensor unit 30 on the circuit board 50, e.g., an intersection of the coupling protrusions 38 with the circuit board 50, may be vertically aligned with the outer peripheral surface 10c of the battery cell 10. In another example, as illustrated in FIG. 7, the coupling position P of the sensor unit 30 may be spaced apart from the outer peripheral surface 10c of the battery cell 10, e.g., outwardly along a radial direction of the battery cell 10, to have an offset between the outer peripheral surface 10c and the coupling position P, e.g., due to thickness of the sensor unit 30. The sensor unit 30 extending from the coupling position P may be pressed against the outer peripheral of the battery cell 10 by the pressing member 40 for tight contact with the outer peripheral surface 10c of battery cell 10.

FIG. 7 is a view illustrating the pressing member 40.

Referring to FIGS. 5 and 7, the pressing member 40 may press the sensor unit 30 against the outer peripheral surface 10c of the battery cell 10. That is, the pressing member 40 presses the sensor unit 30 against the outer peripheral surface 10c of the battery cell 10 while making surface contact with the second surface S2 of the sensor unit 30, such that the first surface S1 of the sensor unit 30 may be brought into contact with the outer peripheral surface 10c of the battery cell 10.

As illustrated in FIG. 7, the pressing member 40 may include a fixed portion 41 on one end thereof and a pressing portion 42 on the other end thereof, e.g., the fixed portion 41 and the pressing portion 42 may be continuous and integral with each other. In an embodiment, the pressing member 40 may be fixed to the cell holder 20 via the fixed portion 41, and may extend downwardly toward the sensor unit 30 to have the pressing portion. 42 extend along, and press against the sensor unit 30. That is, the pressing member 40 may extend obliquely toward the sensor unit 30 from the fixed portion 41 provided on one end, bend as the pressing portion 42 is brought into tight contact with the sensor unit 30, and then extend vertically in parallel with the sensor unit 30 in the length direction of the battery cell 10. As illustrated in 7, the pressing member 40 is in direct contact only with the second surface S2 of the casing 31 among all outer surfaces of the casing 31, As further illustrated in FIG. 7, a longitudinal direction of the pressing portion 42 of the pressing member 40 is parallel to the sensor unit 30 and to the length direction of the at least one battery cell 10. For example, as illustrated in FIG. 7, the pressing portion 42 may press, e.g., contact, a lower portion of the sensor unit 30, a portion in which the thermistor chip 32 is provided rather than an upper portion of the sensor unit 30 to which the pair of lead wires 33 are provided, such that the pressing member 40 may press the sensor unit 30 (i.e., the thermistor chip 32) against the outer peripheral surface 10c of the battery cell 10 in a state in which the fixed portion 41 of the pressing member 40 facing the pair of lead wires 33 is spaced apart from the sensor unit 30 and the pressing portion 42 of the pressing member 40 is in tight contact with the sensor unit 30. Since the thermistor chip 32 of the sensor unit 30 measures the temperature of the battery cell 10, the thermistor chip 32 may be pressed against the battery cell 10 for smooth contact with the battery cell 10. As described above, since the pressing member 40 mainly presses the lower portion of the sensor unit 30 (in which the thermistor chip 32 is placed) rather than pressing the entire sensor unit 30, the thermistor chip 32 may be effectively brought into contact with the battery cell 10.

In relation to the sensor unit 30, the cell holder 20 may include a sensor penetration hole 21' in addition to including the pressing member 40. For example, among the first and second cell holders 21 and 22, the pressing member 40 and the sensor penetration hole 21' may be selectively provided to the first cell holder 21 on which the circuit board 50 is arranged. The sensor unit 30 may extend through the sensor penetration hole 21' of the first cell holder 21 between the circuit board 50 provided above the first cell holder 21 and the battery cell 10 provided below the first cell holder 21. That is, the sensor unit 30 may extend in an upright position from the circuit board 50, pass through the sensor penetration hole 21' of the cell holder 20, and contact the outer peripheral surface 10c of the battery cell 10. In this case, the pressing member 40 may extend from the fixed portion 41 formed at one end near the sensor penetration hole 21' and extend in an upright position in a direction substantially parallel to the sensor unit 30, and may press the sensor unit 30 by the pressing portion 42 provided on the other end of the pressing member 40.

Figure 8:
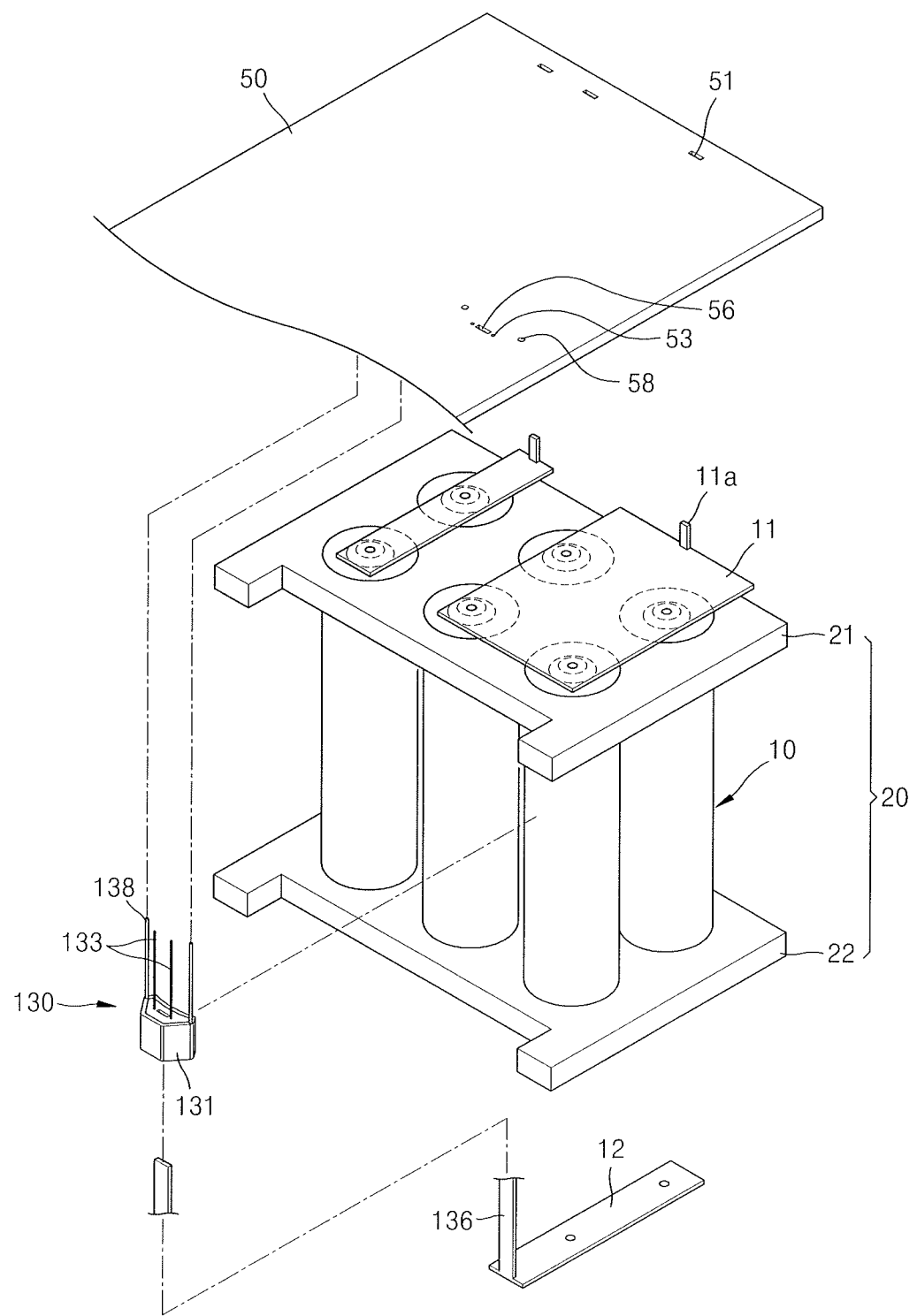
FIG. 8 is an exploded perspective view of a battery pack according to another embodiment.
Figure 9:
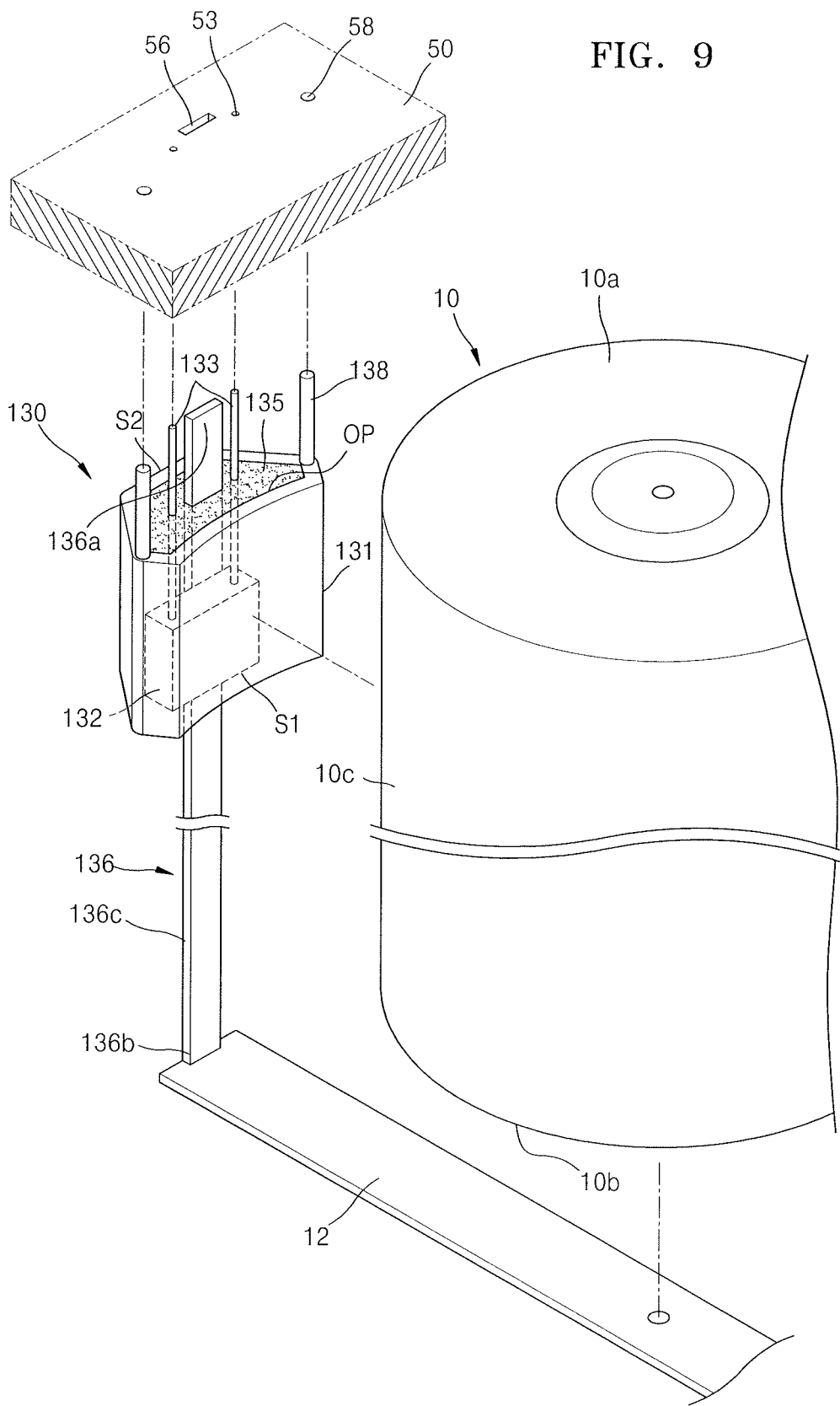
FIG. 9 is a perspective view of an enlarged portion of FIG. 8.
Figure 10:
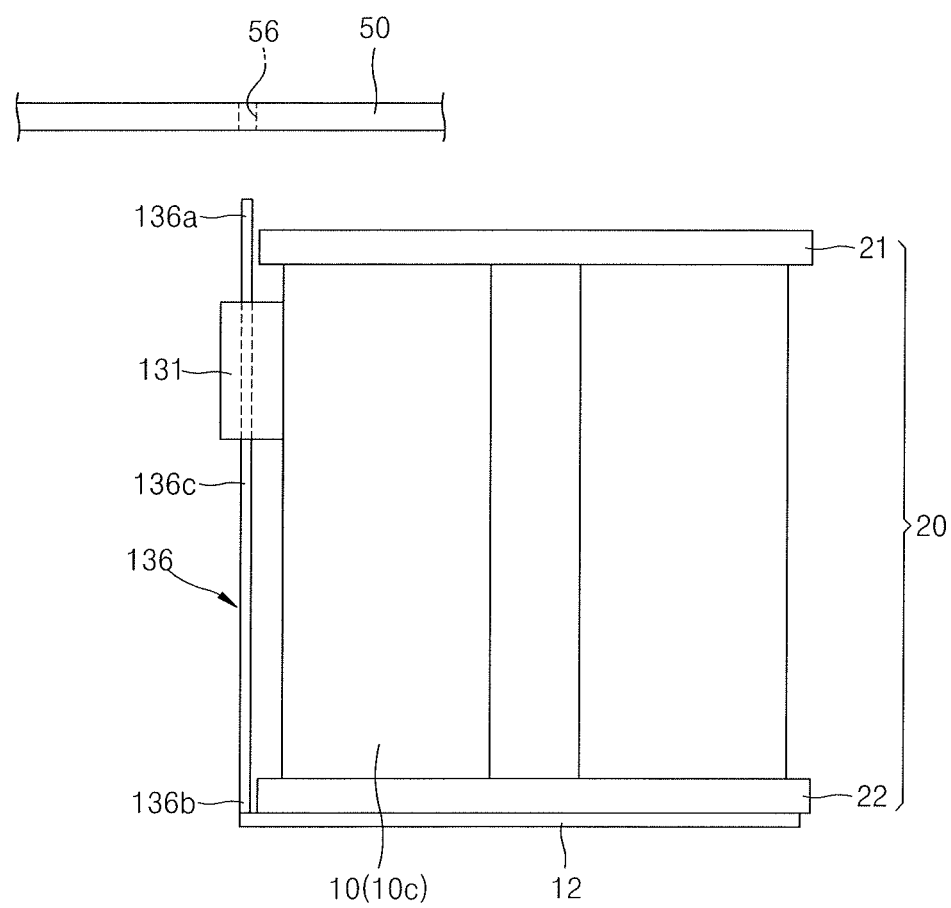
FIG. 10 is a side view of a lateral surface of a sensor unit shown in FIG. 9.

FIG. 8 is an exploded perspective view illustrating a battery pack according to another embodiment, and FIG. 9 is an exploded partial perspective view illustrating a portion of the battery pack in FIG. 8. In addition, FIG. 10 is a view of a lateral surface of a sensor unit 130 shown in FIG. 9.

Referring to FIG. 8, the battery pack may include the battery cells 10, the cell holder 20 into which the battery cells 10 are fitted, the circuit board 50 arranged on the cell holder 20, and a sensor unit 130 connected to the circuit board 50. In an embodiment, the sensor unit 130 may transmit a battery cell voltage signal to the circuit board 50 together with a battery cell temperature signal.

That is, in the embodiment shown in FIG. 1, the sensor unit 30 transmits a battery cell temperature signal to the circuit board 50, and a battery cell voltage signal is transmitted to the circuit board 50 through the first and second tabs 11a and 12a which are additionally provided. In the embodiment shown in FIG. 8, however, the sensor unit 130 may transmit a battery cell voltage signal to the circuit board 50 together with a battery cell temperature signal.

Referring to FIG. 9, the sensor unit 130 may include a casing 131, a thermistor chip 132 accommodated in the casing 131, a pair of lead wires 133 extending from the thermistor chip 132 to the outside of the casing 131, a tab member 136 extending through the casing 131 and electrically connected to an end portion, e.g., a second end portion 10b, of the battery cell 10, and a filler 135 filled in the casing 131.

The casing 131 may be in tight contact with an outer peripheral surface 10c of the battery cell 10, and may be pressed against the outer peripheral surface 10c of the battery cell 10 by a pressing member. As described above with reference to casing 31 in FIGS. 4 to 6, the casing 131 may include the first surface S1 which has a curved surface concave toward the outer peripheral surface 10c of the battery cell 10, the second surface S2 which is flat and opposite the first surface S1, and the lateral surfaces S3 which connect the first and second surfaces S1 and S2 to each other. In addition, the lateral surfaces S3, which connect the first surface 51 having a relatively wide area to the second surface S2 having a relatively narrow area, may include the first lateral surfaces S31 connected to the first surface S1 and the second lateral surfaces S32 connected to the second surface S2. Material characteristics and other technical matters of the casing 131 and the filler 135 are substantially similar to those described above with reference to FIGS. 4-6, and thus, descriptions thereof will not be repeated here.

Referring to FIGS. 9 and 10, the tab member 136 may extend through the casing 131. For example, the tab member 136 may include a first conductive portion 136a provided at a first end thereof and connected to the circuit board 50, a second conductive portion 136b provided at a second end thereof and electrically connected to an end portion of the battery cell 10, e.g., to the second end portion 10b of the battery cell 10, and an extension portion 136c extending between the first and second conductive portions 136a and 136b.

In an embodiment, the second conductive portion 136b of the tab member 136 may be electrically connected to an end portion of the battery cell 10 that is farthest from the circuit board 50, e.g., the second end portion 10b of the battery cell 10. For example, the second conductive portion 136b of the tab member 136 may be electrically connected to the second end portion 10b of the battery cell 10, which is relatively distant from the circuit board 50, in a state in which the tab member 136 extends across the outer peripheral surface 10c of the battery cell 10 (for example, across the casing 131). In another example, the second conductive portion 136b of the tab member 136 may be electrically connected to a first end portion 10a of the battery cell 10. However, since the tab member 136 connects the circuit board 50 to an end portion of the battery cell 10, e.g., the second end portion 10b of the battery cell 10, while extending across the outer peripheral surface 10c of the battery cell 10, the second conductive portion 136b of the tab member 136 may be electrically connected to the second end portion 10b of the battery cell 10 (which is relatively distant from the circuit board 50) rather than being electrically connected to the first end portions 10a of the battery cell 10 which is relatively close to the circuit board 50. For example, the second end portion 10b of the battery cell 10 may be electrically connected to the circuit board 50 through the tab member 136 which has a relatively long length extending across the outer peripheral surface 10c of the battery cell 10 (for example, across the casing 131), and the first end portion 10a of the battery cell 10 may be electrically connected to the circuit board 50 through the first tab 11a (refer to FIG. 8) which has a relatively short length and does not extend across the outer peripheral surface 10c of the battery cell 10 (for example, across the casing 131).

In the embodiment, the expression "the second conductive portion 136b of the tab member 136 is electrically connected to the second end portion 10b of the battery cell 10" may refer to both the case in which the second conductive portion 136b of the tab member 136 is directly connected to the second end portion 10b of the battery cell 10 and the case in which the second conductive portion 136b of the tab member 136 is connected to the second end portion 10b of the battery cell battery cell 10 through a second tab plate 12. In an embodiment, the second conductive portion 136b of the tab member 136 may be connected to the second tab plate 12 and may be electrically connected to the second end portion 10b of the battery cell 10 through the second tab plate 12. In another embodiment, however, the second conductive portion 136b of the tab member 136 may be directly connected to the second end portion 10b of the battery cell 10.

Referring to FIG. 9, the tab member 136 may extend outwardly through the open end portion OP of the casing 131 together with the pair of lead wires 133. The pair of coupling protrusions 138 may be formed on the open end portion OP of the casing 131, and the tab member 136 and the pair of lead wires 133 may extend outward in parallel with each other between the coupling protrusions 138. In this case, the first conductive portion 136a of the tab member 136 and the pair of lead wires 133 are connected to a tab member hole 56 and lead holes 53 formed adjacent to each other in the circuit board 50 such that a circuit region in which voltage information obtained through the tab member 136 and temperature information obtained through the pair of lead wires 133 are processed may be densely formed, thereby reducing the area of the circuit region and the area of the circuit board 50 or making it possible to use a saved area to form another circuit region for processing. For example, the first conductive portion 136a of the tab member 136 and the pair of lead wires 133 may be fitted into and soldered to the tab member hole 56 and the lead holes 53 of the circuit board 50 in an upright position. In this case, since the pair of lead wires 133 are coupled to the circuit board 50 together with the tab member 136, the position of the sensor unit 130 may be securely fixed and maintained without wobbling even when vibration or impact occur.

The tab member 136 may extend toward the second end portion 10b of the battery cell 10 through a bottom portion of the casing 131, the bottom portion being opposite the open end portion OP of the casing 131. A penetration hole may be formed in the bottom portion of the casing 131 for the tab member 136, and a gap formed around the tab member 136 in the penetration hole may be sealed to prevent leakage of the filler 135 when the filler 135 is injected into the casing 131.

The sensor unit 130 may be coupled to the circuit board 50 in an upright position. That is, the sensor unit 130 may be in contact with the outer peripheral surface 10c of the battery cell 10 while extending in an upright or substantially upright position on the circuit board 50 in the length direction of the battery cell 10. Here, the extension direction of the sensor unit 30 may mean the extension direction of the tab member 136 and also the extension direction of the pair of lead wires 133. At least the extension portion 136c of the tab member 136 extends in an upright or substantially upright position from the circuit board 50 in parallel with the pair of lead wires 133 to form the extension direction of the sensor unit 130. The tab member 136 and the pair of lead wires 133 transmit different electrical signals, i.e., voltage information and temperature information, and may be separated from each other and electrically insulated from each other by the filler 135 filled in the casing 131.

In the present embodiment, the sensor unit 130 is of an integrated type transmitting information about the temperature of the battery cell 10 to the circuit board 50 together with information about the voltage of the battery cell 10, thereby simplifying a small-signal wiring structure for transmitting temperature information and voltage information and preventing a short circuit between small-signal wires for transmitting different signals and interference or a short circuit with surrounding structures. Since the tab member 136 and the pair of lead wires 133 are all fixed to the inside of the casing 131, the overall wiring structure may be simplified, and for example, the second tabs 12a (refer to FIG. 1) which are separate from the sensor unit 30 and have a relatively long length may be omitted, e.g., to prevent potential physical interference or short circuit of the second tabs 12a with surrounding structures. In the embodiment shown in FIG. 10, however, the position of the tab member 136 may be firmly fixed using the sensor unit 130 and may be insulated from surrounding structures by using the casing 131.

As described above, according to the one or more of the above embodiments, a sensor unit configured to output information about the temperature of a battery cell is brought into tight contact with the outer peripheral surface of the battery cell such that the temperature of the battery cell may be measured to detect abnormal overheating of the battery cell and protective measures, e.g., stopping charge and discharge operations, may be immediately taken.

According to the one or more of the above embodiments, the sensor unit is of an integrated type transmitting information about the temperature of a battery cell together with information about the voltage of the battery cell, thereby simplifying a small-signal wiring structure for transmitting temperature information and voltage information and preventing a short circuit between small-signal wires for transmitting different signals and interference or a short circuit with surrounding structures.

By way of summation and review, one or more embodiments provide e a battery pack configured to accurately measure the temperature of a battery cell, detect abnormal heating of the battery cell, and immediately operate according to protective measures, e.g., stopping charge and discharge operations. That is, one or more embodiments provide a battery pack having a sensor unit of an integrated type which transmits information about the temperature of a battery cell together with information about the voltage of the battery cell, thereby simplifying a small-signal wiring structure for transmitting temperature information and voltage information and preventing a short circuit between small-signal wires for transmitting different signals and interference or a short circuit with surrounding structures.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   at least one battery cell, the at least one battery cell including:
      first and second end portions spaced apart from each other in a length direction of the at least one battery cell, and
      an outer peripheral surface between the first and second end portions;
   a circuit board connected to the at least one battery cell, the circuit board to monitor the at least one battery cell; and
   a sensor extending from the circuit board toward the at least one battery cell, the sensor contacting the outer peripheral surface of the at least one battery cell, and the sensor including:
      a casing having:
         a first surface that is concave toward the outer peripheral surface of the at least one battery cell, the first surface having a radius of curvature matching the outer peripheral surface of the at least one battery cell,
         a second surface opposite to the first surface, and
         lateral surfaces connecting the first and second surfaces to each other, the lateral surfaces including two first lateral surfaces adjoining respective opposite ends of the first surface and two second lateral surfaces adjoining respective opposite ends of the second surface,
      a thermistor chip inside the casing,
      a lead wire extending from the thermistor chip outside the casing, and
      a filler inside the casing,
      wherein the first surface, the second surface, and the lateral surfaces are connected to each other to define a closed cross-section of the casing, as viewed in a top view,
      wherein the first surface has a largest width among the first surface, the second surface, and the lateral surfaces, as viewed in the top view, the width of the first surface being measured along a curvature of the first surface, and
      wherein the second surface has a smallest width among the first surface and a combined length of one of the two first lateral surfaces with one of the two second lateral surfaces, as viewed in the top view, the width of the second surface being measured along a longitudinal direction of the second surface, as viewed in the top view.

2. The battery pack as claimed in claim 1, wherein the sensor extends in an upright position with respect to the circuit board and along the length direction of the at least one battery cell.

3. The battery pack as claimed in claim 1, wherein the lead wire extends outward from the casing through an open end portion of the casing, the lead wire extending through a lead hole of the circuit board in an upright position.

4. The battery pack as claimed in claim 3, wherein the sensor further includes a pair of coupling protrusions protruding toward the circuit board from the open end portion of the casing, the pair of coupling protrusions extending through a pair of coupling holes in the circuit board.

5. The battery pack as claimed in claim 1, wherein:
   the first surface of the casing directly contacts the outer peripheral surface of the at least one battery cell, and
   the second surface of the casing is flat.

6. The battery pack as claimed in claim 1, wherein the closed cross-section of the casing surrounds an entire perimeter of the thermistor chip, as viewed in the top view.

7. The battery pack as claimed in claim 5, wherein:
   the two first lateral surfaces have slopes extending from the first surface toward boundaries between the first and second lateral surfaces, and
   the two second lateral surfaces have slopes approaching each other toward the second surface from the boundaries between the first and second lateral surfaces.

8. The battery pack as claimed in claim 1, further comprising:
   a battery cell holder having first and second cell holders spaced apart from each other in the length direction of the at least one battery cell, the at least one battery cell being accommodated between the first and second cell holders; and
   a pressing member extending from the first cell holder obliquely and downwardly toward the sensor, the pressing member being in direct contact only with the second surface of the casing among all surfaces of the casing, and the pressing member pressing the sensor against the outer peripheral surface of the at least one battery cell.

9. The battery pack as claimed in claim 8, wherein the pressing member includes:
   a fixed portion directly contacting the battery cell holder, the fixed portion extending obliquely toward the second surface of the casing; and
   a pressing portion in direct contact only with a lower part of the second surface of the casing that overlaps the thermistor chip, the pressing portion being continuous and integral with the fixed portion.

10. The battery pack as claimed in claim 1, wherein the at least one battery cell includes a plurality of battery cells, the battery pack further comprises a cell holder providing assembly positions for the plurality of battery cells, the cell holder structurally binding the plurality of battery cells together.

11. The battery pack as claimed in claim 10, further comprising a pressing member, the pressing member pressing the sensor against the outer peripheral surface of the at least one battery cell, and the pressing member including:

a fixed portion at a first end, the fixed portion being fixed to the cell holder; and a pressing portion at a second end, the pressing portion extending from the fixed portion and contacts the sensor.

12. The battery pack as claimed in claim 11, wherein the pressing member extends obliquely toward the sensor from the fixed portion, the fixed portion being spaced apart from the sensor, and a longitudinal direction of the pressing portion of the pressing member being parallel to the sensor and to the length direction of the at least one battery cell.

13. The battery pack as claimed in claim 10, wherein:
the cell holder is between the circuit board and the at least one battery cell, and
the sensor extends between the circuit board and the at least one battery cell through a sensor penetration hole in the cell holder.

14. The battery pack as claimed in claim 1, wherein the casing and the filler of the sensor include different resin materials.

15. The battery pack as claimed in claim 14, wherein the casing includes a thermoplastic resin, and the filler includes a thermosetting resin.

16. The battery pack as claimed in claim 1, wherein the sensor further includes a tab member electrically connected to one of the first and second end portions of the at least one battery cell.

17. A battery pack, comprising:
at least one battery cell, the at least one battery cell including:
first and second end portions spaced apart from each other in a length direction of the at least one battery cell, and
an outer peripheral surface between the first and second end portions;
a circuit board connected to the at least one battery cell, the circuit board to monitor the at least one battery cell; and
a sensor extending from the circuit board toward the at least one battery cell, the sensor contacting the outer peripheral surface of the at least one battery cell, and the sensor including:
a casing having a first surface that is concave toward the outer peripheral surface of the at least one battery cell,
a thermistor chip inside the casing,
a lead wire extending from the thermistor chip outside the casing,
a filler inside the casing, and
a tab member electrically connected to one of the first and second end portions of the at least one battery cell,
wherein the tab member extends across the outer peripheral surface of the at least one battery cell to penetrate the casing, the tab member electrically connecting the one of the first and second end portions of the at least one battery cell to the circuit board.

18. The battery pack as claimed in claim 17, wherein:
the tab member extends outwardly from the casing in parallel with the lead wire through an open end portion of the casing and is connected to the circuit board, and
the tab member extends to the one of the first and second end portions of the at least one battery cell through a bottom portion of the casing, the bottom portion being opposite the open end portion of the casing.

19. The battery pack as claimed in claim 18, wherein the filler electrically insulates between the tab member and the lead wire.

* * * * *